(12) United States Patent
Ballet et al.

(10) Patent No.: US 7,891,809 B2
(45) Date of Patent: Feb. 22, 2011

(54) PIXELIZED OPTICAL COMPONENT WITH NANOWALLS

(75) Inventors: Jerome Ballet, Charenton le Pont (FR); Christian Bovet, Charenton le Pont (FR); Jean-Paul Cano, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 406 days.

(21) Appl. No.: 11/996,113

(22) PCT Filed: Jul. 13, 2006

(86) PCT No.: PCT/IB2006/003387

§ 371 (c)(1),
(2), (4) Date: Jan. 18, 2008

(87) PCT Pub. No.: WO2007/023394

PCT Pub. Date: Mar. 1, 2007

(65) Prior Publication Data

US 2010/0118260 A1    May 13, 2010

(30) Foreign Application Priority Data

Jul. 20, 2005    (FR) .................... 05 07721

(51) Int. Cl.
*G02C 7/02* (2006.01)
*G02C 7/04* (2006.01)
*A61F 2/16* (2006.01)
*G02B 1/06* (2006.01)
*G02B 3/12* (2006.01)

(52) U.S. Cl. ........... 351/159; 351/160 R; 623/6.13; 623/6.15; 359/665

(58) Field of Classification Search ............... 351/159, 351/160 R, 160 H; 623/6.13, 6.15; 359/665–667
See application file for complete search history.

(56) References Cited

U.S. PATENT DOCUMENTS

| | | | |
|---|---|---|---|
| 3,978,580 A | 9/1976 | Leupp et al. | |
| 5,067,795 A | 11/1991 | Senatore | |
| 7,404,637 B2 * | 7/2008 | Miller et al. | 351/163 |
| 2002/0140899 A1 | 10/2002 | Blum et al. | |
| 2003/0152849 A1 | 8/2003 | Chan-Park et al. | |
| 2004/0120667 A1 * | 6/2004 | Aylward et al. | 385/115 |
| 2004/0169932 A1 * | 9/2004 | Esch et al. | 359/665 |
| 2006/0006336 A1 * | 1/2006 | Cano et al. | 250/345 |
| 2006/0087614 A1 * | 4/2006 | Shadduck | 351/159 |

(Continued)

FOREIGN PATENT DOCUMENTS

DE    19714434 A1    10/1998

(Continued)

Primary Examiner—Jordan M. Schwartz
(74) Attorney, Agent, or Firm—Occhiuti Rohlicek & Tsao LLP

(57) ABSTRACT

An optical component comprises a transparent network of cells juxtaposed and separated by walls parallel to a surface of the component, each cell being hermetically sealed and comprising at least one substance with an optical property, and all or part of the surface of said component comprises walls less than 100 nm thick. The optical component is thus pixelized by a cell network, the cells being separated by walls which may themselves be pixelized. Such an optical component is particularly useful for making optical elements such as ophthalmic lenses.

22 Claims, 1 Drawing Sheet

U.S. PATENT DOCUMENTS

2006/0279848 A1* 12/2006 Kuiper et al. ............... 359/666

FOREIGN PATENT DOCUMENTS

| WO | WO 03/012542 | 2/2003 |
| WO | WO 2006/067309 | 6/2006 |
| WO | WO 2007/010414 | 1/2007 |
| WO | WO 2007/023383 | 3/2007 |

* cited by examiner

PIXELIZED OPTICAL COMPONENT WITH NANOWALLS

CROSS-REFERENCE TO RELATED APPLICATIONS

This application is the National Stage of International Application No. PCT/IB2006/003387, filed on Jul. 13, 2006, which claims the priority of French Application No. 0507721, filed on Jul. 20, 2005. The contents of both applications are hereby incorporated by reference in their entirety.

BACKGROUND

The present invention relates to the production of transparent elements incorporating optical functions. It applies in particular to the production of ophthalmic lenses having miscellaneous optical properties.

Ametropy correcting lenses are conventionally made by shaping a transparent material with a higher refractive index than air. The shape of the lenses is selected so that the refraction at the interfaces between the material and the air causes an appropriate focussing on the wearer's retina. The lens is generally cut out to be adapted to a frame, with an appropriate positioning with respect to the pupil of the corrected eye.

Among the various types of lenses, or others not necessarily limited to ophthalmic optics, it would be desirable to be able to propose a structure which serves to afford one or more optical functions in a flexible and modular manner, while preserving the possibility of cutting out the optical element obtained to incorporate it in a frame imposed or selected elsewhere, or in any other means for holding said optical element.

It is an object of the present invention to answer this need. A further object is that the optical element should be industrially applicable under satisfactory conditions.

SUMMARY

The invention thus proposes an optical component comprising at least one transparent network of cells juxtaposed and separated by walls parallel to one surface of the component, each cell being hermetically sealed and comprising at least one substance with an optical property, and all or part of the surface of said component comprising walls which are less than 100 nm thick.

The cells may be filled with various substances selected for their optical properties, for example associated with their refractive index, their light absorption or polarization capacity, their response to electrical or light stimuli, etc.

The structure thus lends itself to numerous applications, particularly those making use of advanced optical functions. It implies a discretization by pixels of the surface area of the optical element, offering great flexibility in the design and also the application of the element. The structure thus comprises a network of cells bounded by walls, in which at least part of said walls has a nanometric thickness.

It is possible to produce structures pixelized by discretization, which structures consist of a succession of adjacent cells in the plane. These cells are separated by walls. These walls cause a transparency defect of the optical component and they may accordingly give rise to a transparency defect of the optical element comprising such a component. In the context of the invention, an optical component is said to be transparent when the observation of an image through said optical component is perceived without a significant loss of contrast, that is, when the formation of an image through said optical component is obtained without reducing the quality of the image. In the context of the invention, this definition of the term transparent is applicable to all objects qualified as such in the description.

The walls separating the cells of the optical component interact with the light by diffracting it. Diffraction is defined as the scattering of light that is observed when a light wave is materially limited (J-P. Perez—Optique, Fondements et applications $7^{th}$ edition —Dunodp—October 2004, p. 262). Thus an optical component comprising such walls transmits a degraded image because of this scattering of the light caused by said walls. Microscopic diffraction is macroscopically manifested by scattering. This macroscopic scattering or incoherent scattering is manifested by a diffuse halo of the pixelized structure of the optical component and hence by a loss of contrast of the image observed through said structure. This loss of contrast can be regarded as a loss of transparency, as defined above. This macroscopic scattering effect is unacceptable for making an optical element comprising a pixelized optical component as understood in the context of the invention. This is especially true when said optical element is an ophthalmic lens, which must on the one hand be transparent, in the sense defined above, and on the other, comprise no cosmetic defect liable to disturb the view of the wearer of such an optical element.

A simple means for diminishing this phenomenon consists in filling the cells with a liquid having the same refractive index as the walls. Such a solution is of limited interest because it requires the need for a correlation as regards the refractive indices of these two entities. Another means of diminishing this macroscopic scattering consists in reducing the diffraction at the walls by limiting their size. When the wall thickness becomes small compared to the wavelength of light, the interaction therewith may become negligible. Thus, the wall no longer causes any perceptible scattering, thereby preserving the transparency of the device comprising it, independently of the refractive index of the optical substance filling the cell bounded by the walls.

One object of the present invention is hence to produce a transparent optical component, comprising at least one transparent network of cells juxtaposed and separated by walls parallel to one surface of the component, each cell being hermetically sealed and comprising at least one substance with an optical property, and all or part of the surface of said component comprising walls which are less than 100 nm thick.

In a first variant of the invention, the optical component is such that all the walls of the cell network, parallel to the component surface, are less than 100 nm thick.

In a second variant of the invention, the optical component is such that part of the walls of the cell network, parallel to the surface of said component, is less than 100 nm thick, and part of the walls of said cell network is between 0.10 μm and 5 μm thick. In this second variant, advantageously, the walls of the cell network which are more than 100 nm thick themselves represent a network of walls less than 100 nm thick. The optical component thus comprises a network of cells separated by nanometric walls, said nanometric walls being themselves groupable into a network of nanometric walls capable of separating neighbouring cells. In general, in the context of the invention, wall network means such a grouping of nanometric walls leading to the formation of a wall thicker than 100 nm and able to separate neighbouring cells. Cell network means a network consisting of unitary nanometric walls and/ or a wall network as defined above.

The invention thus comprises an optical component pixelized by a network of cells, each cell being optionally separated from its neighbour by walls of nanometric size.

In the context of the invention, each cell can adopt any geometry. Thus the cell network may consist of walls in the form of mutually straight and/or curved segments in order to supply a closed structure to each cell. The cell network may also adopt any geometric structure. Thus in the context of the invention, it is possible to use any and all known ways to pave the entire surface occupied by said network, uniformly or not. Advantageously, use can be made of cells of hexagonal, rectangular or square geometry. The network of nanometric walls then advantageously has a geometric lattice of hexagonal or tetragonal type.

The cell network, and hence the construction of the network walls, can be achieved by using manufacturing methods, derived from microelectronics, well known to a person skilled in the art. As a non-limiting illustration, mention can be made of methods such as hot printing, hot embossing, moulding, photolithography, deposition such as contact printing, screen printing, or ink jet printing. Advantageously, the nanometric walls making up the cell network and/or the wall network are made by a process of nanomoulding, soft lithography, or immersion photolithography.

All the walls of the cell network and, optionally, of the wall network, can be formed directly on a rigid transparent support, or within a flexible transparent film then transferred onto a rigid transparent support. Said rigid transparent support may be convex, concave, or plane on the side receiving the cells.

The geometry of the cell network is characterized by dimensional parameters which can generally be reduced to the dimensions (D) of the cells parallel to the surface of the optical component, to their height corresponding to the height (h) of the walls separating them, and to the thickness (e) of these walls (measured parallel to the component surface). Parallel to the component surface, the cells are preferably separated by walls of height (h) between 0.1 µm and 10 µm inclusive. The dimension (D) of the cells is highly variable and may range from a few nanometres to 500 µm.

With a dimensioning of the walls as defined above, it is possible to make a set of cells juxtaposed at the surface of the optical component having a fill factor T of higher than 90%. In the context of the invention, the fill factor is defined as the area occupied by the cells filled by the substance, per unit area of the optical component. In other words, all together the cells occupy at least 90% of the area of the component, at least in a region of the optical component provided with the set of cells. Advantageously, the fill factor is between 90% and 99.5% inclusive, and preferably between 98% and 99.5%.

In one embodiment of the method, the substance with an optical property contained in at least some of the cells is in liquid or gel form. Said substance may particularly have at least one of the optical properties selected from tinting, photochromism, polarization and refractive index.

The set of cells of the optical component may include several groups of cells containing different substances. Similarly, each cell may be filled with a substance having one or more optical properties described above.

A further aspect of the invention relates to a transparent optical element, particularly a spectacle lens, made by cutting out such an optical component. A spectacle lens comprises an ophthalmic lens. Ophthalmic lens means lenses adapting to a spectacle frame to protect the eye and/or correct the vision, these lenses being selected from afocal, unifocal, bifocal, trifocal and progressive lenses. While ophthalmic optics is a preferred field of application of the invention, it should be understood that this invention is applicable to transparent optical elements of other types, such as, for example, lenses for optical instruments, filters particularly for photography or astronomy, optical sighting lenses, ocular visors, optics of lighting devices, etc. In the invention, ophthalmic optics includes ophthalmic lenses, as well as contact lenses and ocular implants.

BRIEF DESCRIPTION OF THE DRAWINGS

Other features and advantages of the present invention will appear in the description below of non-limiting exemplary embodiments, with reference to the drawings appended hereto, in which.

DETAILED DESCRIPTION

Figure 1:
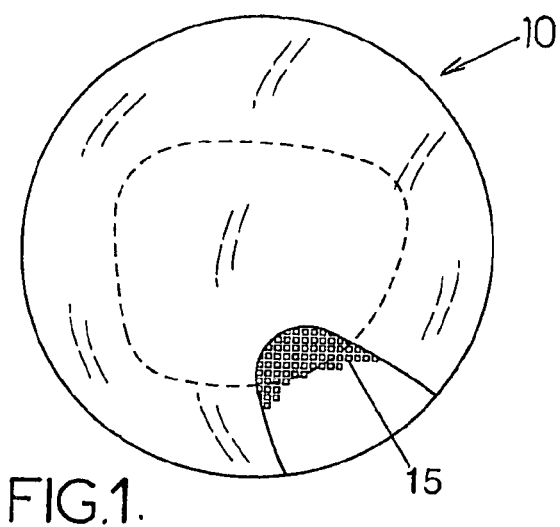
FIG. 1 is a front view of an optical component of the invention.

The optical component 10 shown in FIG. 1 is a blank for a spectacle lens. A spectacle lens comprises an ophthalmic lens, as defined above. Naturally, while ophthalmic optics is a preferred field of application of the invention, it should be understood that this invention is applicable to transparent optical elements of other types.

Figure 2:
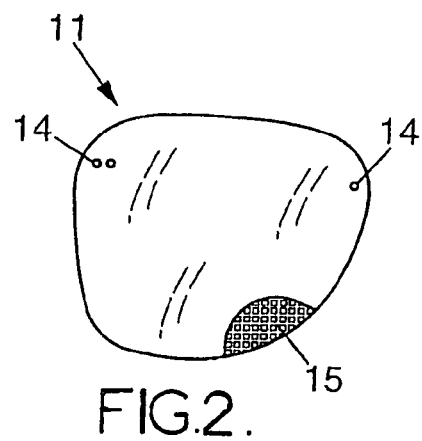
FIG. 2 is a perspective view of an optical element obtained from this optical component.

FIG. 2 shows a spectacle lens 11 obtained by cutting out the blank 10 along a predefined contour, shown by a broken line in FIG. 1. This contour is basically arbitrary, provided it fits into the area of the blank. Mass-produced blanks can thus be used to obtain lenses adaptable to a wide variety of spectacle frames. The edge of the lens cut out can be trimmed without any problem, conventionally, to give it a shape adapted to the frame and/or to the method for fixing the lens to this frame and/or for aesthetic reasons. It is possible to drill holes 14 therein, for example to receive screws used to fasten it to the frame.

Figure 3:
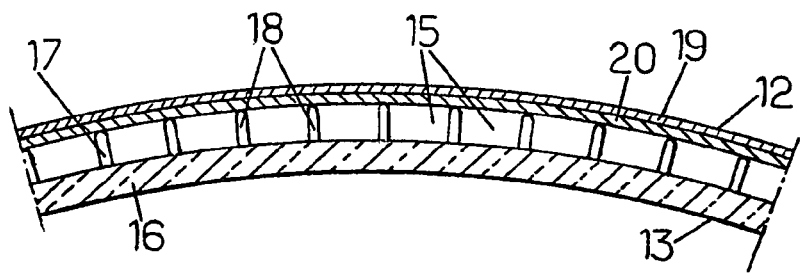
FIG. 3 is a schematic cross section of an optical component of the invention.

The general shape of the blank 10 may conform to industry standards, with, for example, a circular contour with a diameter of 70 mm (millimetres), a front convex face 12, and a back concave face 13 (FIG. 3). Conventional cutting, trimming and drilling tools can thus be used to obtain the lens 11 from the blank 10.

In FIGS. 1 and 2, a partial removal of the surface layers reveals the pixelized structure of the blank 10 and the lens 11. This structure consists of a network of cells or microtanks 15 formed in a layer 17 of the component, each cell being separated by walls 18. In these figures, the dimensions of the layer 17, the walls 18, and the cells 15 have been exaggerated compared to those of the blank 10 and of its substrate 16 to facilitate the reading of the drawing.

Figure 4:
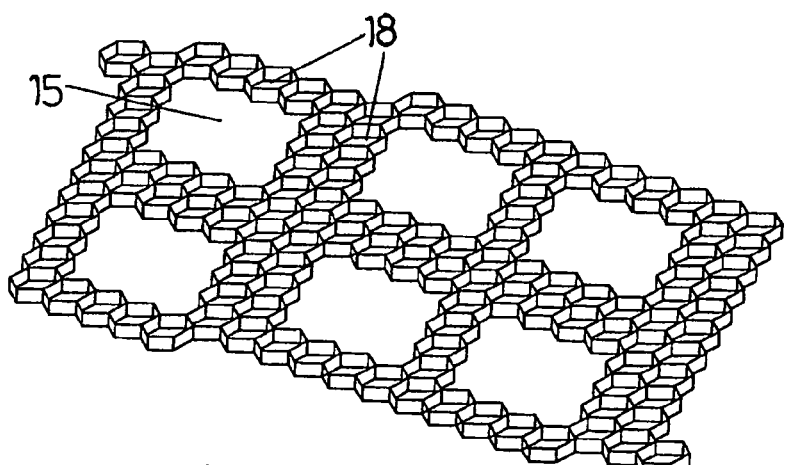
FIG. 4 is a schematic perspective view showing a cell network and a wall network of the invention.

FIG. 4 shows an optical component comprising a cell network 15 separated by nanometric walls 18 organized into a hexagonal geometry.

Figure 5:
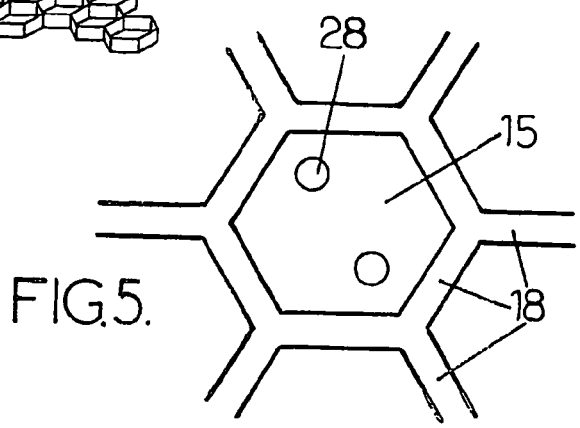
FIG. 5 is a schematic front view showing another type of cell network comprising spacers.

FIG. 5 is a front view of a hexagonal cell 15 separated from these neighbours by walls 18 less than 100 nm thick and comprising two spacers 28. These spacers 28 serve to enhance the mechanical properties of the optical component.

The spacers 28 are separate from the walls 18 of the corresponding cells and are preferably located at some distance therefrom. They may have a thickness of less than 5 μm, measured parallel to the component surface. In this way, the spacers 28 do not substantially modify the optical characteristics of the component 10, compared with the characteristics resulting from the substances contained in the cells 15. The spacers have a height of between 0.1 μm and 10 μm, perpendicular to the surface of the blank 10. Advantageously, the spacers 28 have an identical height to the walls 18 making up the set of cells.

Optionally, the spacers 28 may be made from an absorbing material. In the context of the invention, absorbing material means a material absorbing at least part of the visible spectrum, that is, having at least one wavelength absorption band between 400 nm and 700 nm. Advantageously according to the invention, materials having an absorption band over the entire visible spectrum are preferred. The materials used for making the walls may optionally comprise a spectral absorption band in the near infrared, i.e above than 700 nm, and/or in the near ultraviolet, i.e. below than 400 nm.

The spacers 28 and the walls 18 may comprise respective portions of the same material. Alternatively, the spacers 28 may be added-on elements arranged in the cells 15.

The layer 17 incorporating the cell network 15 may be covered by a number of additional layers 19, 20 (FIG. 1), according to standard practice in ophthalmic optics. These layers have functions, for example, of impact strength, scratch resistance, tinting, anti-reflective, anti-soiling, etc. In the example shown, the layer 17 incorporating the cell network is placed immediately above the transparent substrate 16, but it should be understood that one or more intermediate layers may be located between them, such as layers having functions of impact strength, scratch resistance, and tinting.

The transparent substrate 16 may be made from glass or various plastics commonly used in ophthalmic optics. Among the plastics that may be used, mention can be made, in an indicative and non-limiting manner, of polycarbonates; nylon, polyimides, polysulphones; polyethylene terephthalate/polycarbonate copolymers, polyolefins, particularly polynorbornenes; polymers and copolymers of diethylene glycol, bis(allylcarbonate); (meth)acrylic polymers and copolymers particularly (meth)acrylic polymers and copolymers derived from bisphenol A; thio(meth)acrylic polymers and copolymers; urethane and thiourethane polymers and copolymers; epoxy polymers and copolymers; and episulphide polymers and copolymers.

The layer 17 incorporating the cell network is preferably located on its front convex face 12, the back concave face 13 remaining free to be optionally reshaped by machining and polishing if necessary. The optical component may also be located on the concave face of a lens. Obviously, the optical component may also be integrated on a plane optical element.

The microtanks 15 are filled with the substance with an optical property, in the liquid or gel state. The solution or suspension forming the substance with an optical property may be the same for all the microtanks of the network, in which case it can be introduced simply by immersing the component in an appropriate bath, by a method such as silk screen printing, by a spin-on process, or by a spray process. It is also possible to inject it locally into the individual microtanks using a ink jet system.

To hermetically seal a set of filled microtanks, a bonded plastic film, for example, can be applied, heat sealed or hot laminated to the top of the walls 18. It is also possible to deposit, on the zone to be closed, a solution polymerizable material, immiscible with the substance with an optical property contained in the microtanks, and then to polymerize this material, for example by heat or irradiation.

Once the network of microtanks 15 has been completed, the component can receive the additional layers or coatings 19, 20 to terminate its fabrication. Components of this type are fabricated in series and stored to be subsequently retrieved and cut out individually according to the needs of a client.

In one variant, the optical component, consisting of a network of microtanks, is constructed in the form of a flexible transparent film. Such a film can be made by techniques similar to those described above. In this case, the film can be made on a plane and non-convex or concave support.

The film is, for example, manufactured industrially on a relatively large scale, and then cut out to the appropriate dimensions to be transferred to the substrate 16 of a blank. This transfer can be achieved by bonding the flexible film, by thermoforming the film, or by physical adhesion under vacuum. The film can then receive various coatings, as in the previous case, or be transferred to the substrate 16 itself coated with one or more additional layers as described above.

In one field of application of the invention, the optical property of the substance introduced into the microtanks 15 is related to its refractive index. The refractive index of the substance is modulated along the surface of the component to obtain a correction lens. The modulation, can, for example, be achieved by introducing substances with different indices during the fabrication of the microtank network 15.

Among the substances that can be used in this application, mention can be made, for example, of mesoporous materials or liquid crystals. These liquid crystals can be fixed by a polymerization reaction, for example caused by irradiation. They can thus be fixed in a state selected to introduce a predefined optical delay in the light waves passing through them. In the case of a mesoporous material, the refractive index of the material can be controlled by varying its porosity. Another possibility is to use photopolymers, of which one well known property is to change the refractive index during the polymerization reaction caused by irradiation. These changes in index are due to a modification of the density of the material and to a change in chemical structure. It is preferable to use photopolymers, which only undergo a very slight variation in volume during the polymerization reaction.

The selective polymerization of the solution or suspension is carried out in the presence of radiation that is spatially differentiated from the component surface, in order to obtain the desired index modulation. This modulation is previously determined according to the estimated ametropy of the eye of a patient to be corrected.

In another application of the invention, the substance introduced in gel or liquid form into the microtanks has a polarization property. Among the substances used in this application, mention can be made of liquid crystals.

In another application of the invention, the substance introduced in liquid or gel form into the microtanks has a photochromic property. Among the substances used in this application, mention can be made for example of photochromic compounds containing a central motif such as a spirooxazine, spiro(indoline-[2,3']-benzoxazine), chromene, homoazaadamantane spiroxazine, spirofluorene-(2H)-benzopyrane, naphtho[2,1-b]pyrane nucleus.

In the context of the invention, the substance with an optical property may be a dye, or a pigment suitable for modifying the transmission rate.

The invention claimed is:

1. Transparent optical component, comprising at least one transparent network of cells extending parallel to a surface of the component, the cells juxtaposed and separated by walls extending perpendicular to a surface of the component, each cell being hermetically sealed and including at least one substance with an optical property, at least some of said component including walls which are less than 100 nm thick as measured in a direction parallel to the component surface, and at least one cell of the cell network includes one or more spacers extending perpendicular to the surface of said component, each spacer having a height of between 0.1 µm and 10 µm.

2. Optical component according to claim 1, in which all the walls of the cell network are less than 100 nm thick.

3. Optical component according to claim 1, in which part of the walls of the cell network is less than 100 nm thick, and part of the walls of said cell network is between 0.10 µm and 5 µm thick.

4. Optical component according to claim 3, in which the walls of the cell network which are more than 100 nm thick themselves include a network of walls less than 100 nm thick.

5. Optical component according to claim 4, in which said wall network is arranged in a tetragonal or hexagonal lattice.

6. Optical component according to claim 1, in which all or part of the cells have a finite geometric shape of hexagonal or tetragonal type.

7. Optical component according to claim 1, in which all or part of the cells have a non-uniform geometric shape.

8. Optical component according to claim 4, in which the walls of the cell network including walls of the wall network have a height, perpendicular to the surface of the optical component, of between 0.1 µm and 10 µm.

9. Optical component according to claim 1, comprising a rigid transparent support on which the cell network is formed.

10. Optical component according to claim 1, comprising a rigid transparent support on which a transparent film incorporating the cell network is transferred.

11. Optical component according to claim 9, in which the rigid transparent support is selected from convex, concave and plane, on the side receiving the cell network.

12. Optical component according to claim 1, in which the substance with an optical property contained in at least some of the cells is in liquid or gel form.

13. Optical component according to claim 1, in which the optical property is selected from a property of tinting, photochromism, polarization, refractive index.

14. Optical component according to claim 1, in which the set of cells has a fill factor of between 90% and 99.5% inclusive parallel to said component surface.

15. Optical component according to claim 14, in which the fill factor is between 98% and 99.5%.

16. Optical component according to claim 1, in which each spacer is less than 5 µm thick.

17. Optical component according to claim 1, in which the spacer is absorbing.

18. Optical component according to claim 1, in which the spacer and the walls of the cell network are made from the same material.

19. Optical component according to claim 1, in which the spacer is an added-on element arranged in the cell.

20. Use of a transparent optical component according to claim 1 in the fabrication of a transparent optical element selected from ophthalmic lenses, contact lenses, ocular implants, lenses for optical instruments, filters, optical sighting lenses, ocular visors, and optics of lighting devices.

21. Spectacle lens, made by cutting out an optical component according to claim 1.

22. Spectacle lens according to claim 21, in which at least one hole is drilled through the component to fasten the lens to a frame.

* * * * *